Dec. 29, 1936.   R. C. BARLER ET AL   2,066,243
WEIGHING SCALE
Filed Feb. 2, 1934
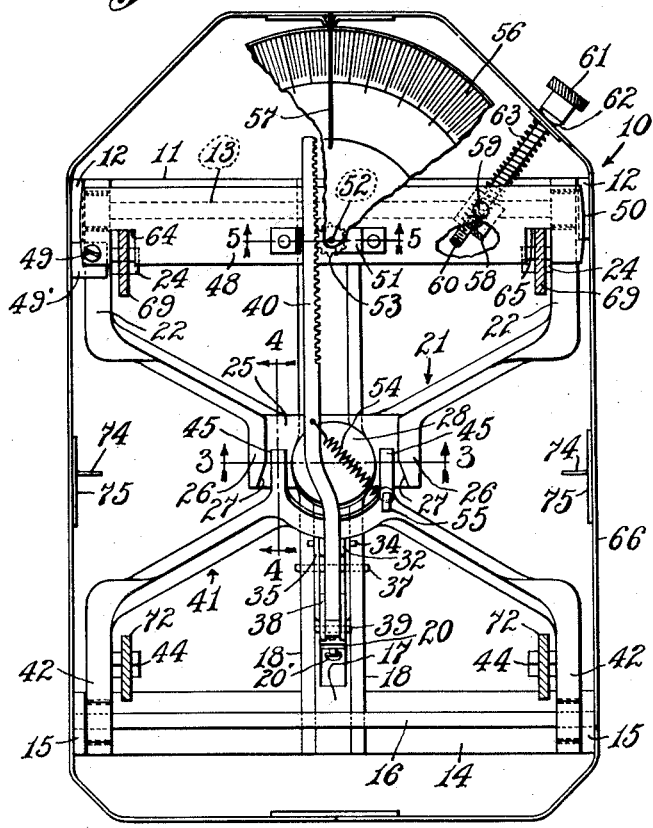
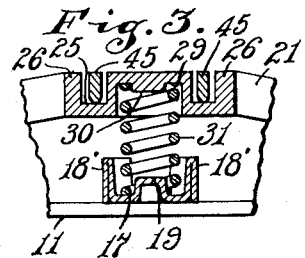
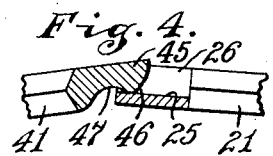
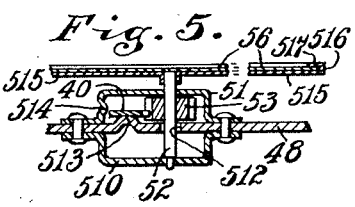
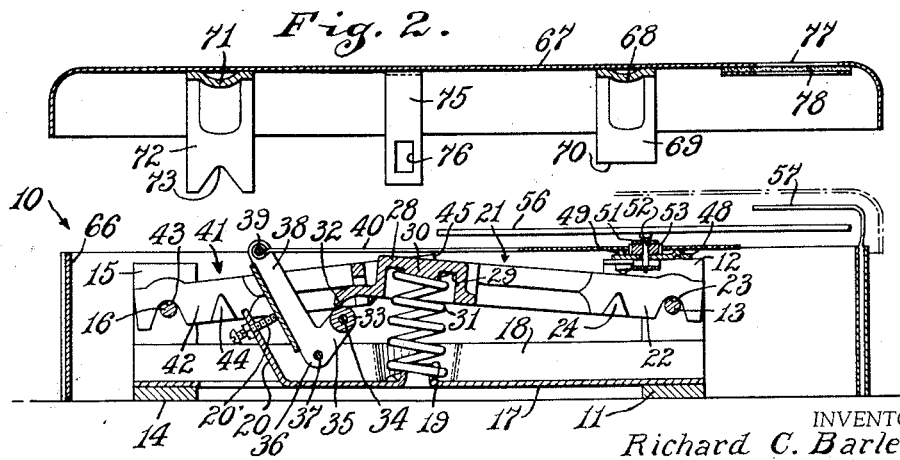
INVENTORS
Richard C. Barler and
Carl Burkhard,
BY
Hood & Hahn
ATTORNEYS

UNITED STATES PATENT OFFICE 2,066,243

WEIGHING SCALE

Richard C. Barler and Carl Burkhard, Goshen, Ind., assignors to Continental Scale Works, Chicago, Ill., a corporation of Illinois Application February 2, 1934, Serial No. 709,418

6 Claims. (Cl. 265—68)

The present application relates to a weighing scale, and more particularly to a scale of the "bathroom" type which has become so popular within the past several years.

The primary object of the invention is to provide a scale of acceptable accuracy which will be (A) extremely simple in construction; (B) unusually inexpensive to build; (C) rugged and durable enough to withstand rough treatment; (D) unlikely to wear, break, or lose its accuracy; and (E) capable of a wide range of adjustment through the manipulation of a simple, easily accessible, screw.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a plan view of a scale constructed in accordance with the present invention, certain portions being broken away for clarity of illustration, and certain parts of the cover being shown, as in position, to demonstrate a function thereof;

Fig. 2 is a central longitudinal section through the said scale, the cover being shown in elevated relationship;

Fig. 3 is a section of a detail taken on line 3—3 of Fig. 1, and looking in the direction of the arrows;

Fig. 4 is a section of a detail taken on the line 4—4 of Fig. 1, and looking in the direction of the arrows; and Fig. 5 is an enlarged vertical section taken substantially on the line 5—5 of Fig. 1 and looking in the direction of the arrows.

Referring more particularly to the drawing, it will be seen that we have illustrated a base indicated generally at 10. Said base comprises a strap 11 having its ends turned upwardly to form standards 12 upon which is supported a cross rod 13; and a second, parallel strap 14, having its ends bent upwardly to form standards 15 between which is supported a cross rod 16.

Mounted upon, and joining, the straps 11 and 14 is a channel member 17 preferably formed of sheet metal, as is clearly shown in Fig. 3, and having parallel flanges 18. Adjacent the mid point of said channel member 17, said flanges are bowed, as at 18' to surround a punched up nub 19 upstanding from the floor of said channel member. At a point spaced from said nub 19, the floor of the channel member 17 is punched out to form an upstanding tongue 20 which is formed with a tapped hole adjustably receiving a stop screw 20'.

The illustrated scale includes a lever, indicated generally at 21, and comprising two parallel legs 22. Each of said legs is formed adjacent its end, with a notch 23, and said notches 23 are associated with the cross rod 13. At a point somewhat spaced from each notch 23, said lever 21 is provided with a knife-edge journal or fulcrum 24.

The two legs 22 join to form a platform 25 bounded on two parallel sides by upstanding flanges 26 which, preferably, are cut away as at 27. An inverted cup 28 is upstanding substantially at the center of said platform, and is interiorly formed with an annular pocket 29 centrally provided with a nub 30. Said pocket 29 receives one end of a coiled spring 31, said spring end surrounding the nub 30; and the opposite end of said spring is received between the bowed portions 18' of the flanges 18 and surround the nub 19.

Thus, it will be clear that one end of the lever 21 is fulcrumed on the cross rod 13, while the opposite end thereof is supported by the spring 31.

At its extremity, the lever 21 carries a cam finger 32 which contacts a roller 33 journaled on a hub 34 carried on one arm 35 of a bell crank lever 36 pivotally mounted upon a hub 37 carried between the flanges 18 at a point between the spring 31 and the tongue 20. The other arm 38 of said bell crank lever 35 carries a pin 39 to which is secured one end of a rack 40.

A second lever 41, somewhat similar to the lever 21, comprises a pair of parallel legs 42; and each of said legs 42 is formed with a notch 43 associated with the cross rod 16. Adjacent each notch 43, each leg 42 is provided with a knife-edge journal or fulcrum 44.

The legs 42 merge adjacent the center line of the scale, and the lever 41 is provided with fingers 45 adapted to lie on the surface of the platform 25. As shown in Fig. 4, each finger 45 is cut away, at its lower edge, just beyond the edge of the platform 25, as at 47, and each finger 45 is rounded, as at 46, in the portion which actually contacts the platform 45. Thus, friction between the fingers 45 and the platform 25 is reduced to a minimum.

A bar 48 is pivoted, as at 49, on a bracket 49' extending laterally from the upper end of one of the standards 12. The opposite end 50 of said bar 48 rests upon the upper end of the other standard 12. Intermediate its ends, said bar 48 carries a U-shaped strap 510 and an inverted U-shaped strap 51, the strap 510 depending from the bar 48, and the strap 51 projecting upwardly from the bar. A shaft 52 has bearing in suitable aligned apertures formed in said straps 510 and 51, said shaft passing loosely through an aperture 512 formed in the bar 48.

On said shaft 52 is rigidly mounted a gear 53 with which meshes the rack 40. It will be seen that said rack rides upon a hump 513 formed in the bar 48, and is held against disengagement from the gear 53 by a hump 514 formed in one upstanding wall of the strap 51. A coiled spring 54 is connected at one end to said rack 40, and at its opposite end to a lug 55 which may desirably be carried upon the lever 21. It will readily be seen that the spring 54 serves the double function of (A) holding the rack resiliently in meshing engagement with the gear 53; and (B) urging the rack 40 to return, upon release, to its normal position after movement thereof.

The gear 53 is positioned between the bar 48 and the strap 51 and, as has been stated, said gear is rigid on the shaft 52. The upper end of said shaft projects upwardly beyond the strap 51, and has rigidly secured thereto a metal spider 515 the outer annulus of which is turned as at 516, and then rebent as at 517 to overlie the outer periphery of a graduated dial 56 with which cooperates a pointer 57. It will be clear that this construction may be a relatively heavy dial.

It will be obvious that, as the rack 40 is reciprocated, while in mesh with the gear 53, it will cause rotation of the dial 56 with respect to the pointer 57.

A bracket 58 is secured, as at 59, to the lower surface of the bar 48; and said bracket 58 is formed with a tapped aperture for the reception of a threaded screw 60. As is clearly shown, the base 10 includes a perimetral sheath 66 which, in the illustrated embodiment, is formed of sheet metal. The screw 60 is provided with a knurled head 61 positioned outside said sheath. Said screw 60 passes freely through an aperture formed in said sheath, and the inner end of said knob 61 is rounded, as at 62, for cooperation with said sheath. A spring 63 is sleeved over said screw 60, and resiliently holds the screw 60 against withdrawal from the sheath, said spring being compressed between the bracket 58 and the sheath 66.

It will be obvious that, assuming the screw 60 to be a right-hand screw, if the knob 61 is rotated in a clockwise direction, the bar 48 will be caused to move in a counter-clockwise direction about its pivot 49, as viewed in Fig. 1. If said bar 48 is so moved, the rack 40 being held against movement, it will be clear that the gear 53, shaft 52, and dial 56 will be moved in a counter-clockwise direction about the axis of said shaft 52, as the result of cooperation between said gear 53 and said rack 40.

As is clearly shown, the bar 48 somewhat overlies the fulcrums 24; and said bar is formed with notches 64 and 65 adjacent said fulcrums.

A cover, or weighing platform 67 comprises merely a platform of sheet metal supported upon a strap 68 having down-turned ends 69 terminating in flat surfaces 70, and a strap 71 having down-turned ends 72 formed with notches 73 in their extremities. The end surfaces 70 of the legs 69 rest upon the fulcrums 24, while the notches 73 of the legs 72 rest upon the fulcrums 44.

As is clearly shown in Fig. 1, the legs 69 are received in the notches 64 and 65; and act to limit adjustment of the bar 48 in a clockwise direction about its pivot 49.

In the illustrated embodiment, the sheath 66 is provided with a pair of fingers 74, while the platform 67 is provided with a pair of downwardly extending elements 75, each formed with an aperture 76 therein. Originally, said elements 75 are inclined downwardly and inwardly so that their lower extremities freely pass the fingers 74. After the legs 69 and 72 have been associated with the fulcrums 24 and 44, the lower ends of the elements 75 are bent outwardly, whereby the fingers 74 are caused to enter the apertures 76. With the elements 75 in the positions illustrated in Fig. 1, it will be seen that the fingers 74 cooperate with said elements 75 to limit movement of the platform 67 both upwardly and downwardly.

Adjacent one end, the platform 67 is formed with an aperture 77 through which the pointer 57 and dial 56 may be seen. If desired, said aperture 77 may be closed by a sheet 78 of any suitable transparent material.

When the above-described organization is assembled, a weight or force applied to the platform 67 will be transmitted through the legs 69 and 72 and fulcrums 24 and 44 to the levers 21 and 41; and thus to the supporting spring 31. As said spring is compressed, the finger 32 will act upon the roller 33 to move the bell crank lever 36 in a clockwise direction as viewed in Fig. 2. Thereby, the rack 40 is shifted upwardly, as viewed in Fig. 1, to effect clockwise rotation of the dial 56. Obviously, the degree of rotation of the dial 56 will be dependent upon the degree of depression of the spring 31; which, in turn, is dependent upon the degree of force or weight applied to the platform 67.

It is to be noted that the finger 32 is suitably cammed to compensate for the inaccuracy which would be inherent in the device if the lower surface of said finger were plane.

One of the defects often found in scales of this type lies in the fact that the accuracy of the scales is destroyed by the repeated shocks to which the indicating mechanism is subjected when users step off the platform and the weighing spring returns the mechanism to zero position. Most of such scales are provided with stops, just as is the present scale, so that the indicating mechanism is not permitted to swing downwardly below zero position. When a two hundred pound person steps off the scale, the spring, acting without restraint imparts a high rate of acceleration to the indicating mechanism; and if that mechanism is stopped short when it reaches the zero position, it is obvious that serious strains are applied to light parts. It is also obvious that, where the dial, with its supporting spider, is as heavy as the dial in the present organization, those strains are exaggerated by the momentum of the relatively heavy dial support.

In the present organization, that defect is, to a material extent, overcome by the fact that the adjusting mechanism provides a resilient shock absorber for taking up the shock resultant from the sudden stopping of return movement of the indicating mechanism.

Incidentally, it is to be noted that there is provided a one way connection between the weighing spring and the indicating mechanism, and that the indicating mechanism is returned to zero position not by the force of the weighing spring 31, but by the light spring 54.

mechanism, the arm 38 of the bell crank lever 36 strikes the stop screw 20'. The spider 515 having acquired considerable momentum, the gear 53 tends to continue to rotate in a counterclockwise direction after the rack 40 has been stopped by contact of said bell crank lever arm with said stop screw. That tendency of the gear 53 to continue to rotate is resiliently absorbed under those circumstances, by a slight counterclockwise movement of the bar 48, accompanied by a slight compression of the spring 63 between the bracket 58 and the sheath 66.

We claim as our invention:

1. A weighing scale comprising a base, weighing mechanism comprising a pair of levers fulcrumed on spaced apart supports in said base and extending therefrom to an intermediate focal point in the weighing scale, a spring support comprising an element on said base having a boss opposite said focal point, a helical spring receiving said boss in one end and carried by said spring support and extending between said spring support and said levers, said spring engaging said levers at said focal point, at least one of said levers being formed with a socket receiving an end of said spring and a bearing way, the other lever having a portion engaging said bearing way, said weighing mechanism including a weight-receiving platform carried by both levers whereby when a weight is applied on the platform, the levers will be tilted on their fulcrums in a direction to exert forces upon said spring to compress the same between the socketed lever and the embossed portion of the spring support, indicating means carried by said base, and means driven by the weighing mechanism for actuating said indicating means.

2. A weighing scale comprising a base of shallow configuration, weighing mechanism comprising substantially horizontally extending lever means fulcrumed in said base, a weight receiving platform enclosing the top of said base and carried by said lever means, yielding means on said base and operatively connected to resist tilting movement of said lever means in said base under the influence of a weight applied on said platform, indicating means comprising a pair of relatively movable indicator elements including a pointer element and a graduated dial element, said dial element extending horizontally between said platform and the lever means, indicator actuating means comprising a movable actuating element connected with one of said indicator elements and a driving element drivingly connected with said actuating element, said driving element extending horizontally between the dial and said levers, a tilting lever comprising a bell crank, one arm of which is connected to said driving element, and means engaging another arm of said bell crank for tilting the same in response to movement of the lever means.

3. A weighing scale comprising a base, an indicator on the base, weighing mechanism including a weight receiving platform and means to actuate the indicator in response to the application of a weight to be measured on said platform, said means comprising a tilting member drivingly connected with said indicator and tiltable in one direction by the movement of said weighing mechanism when a weight to be measured is applied on said platform, and adjustable means on said base forming a stop for limiting the movement of said tilting element in the opposite direction.

4. A weighing scale comprising a base, weighing means on the base and including opposed weighing levers fulcrumed on the base, a weight-receiving platform carried by the levers and yielding weighing means adapted to be deflected by the levers in proportion to the weight of an object on the platform, a plate adjustably shiftable on the base, a rotatable indicator element carried by the plate, driving means for turning the indicator element on the plate in response to lever movement, and means to shift the plate with respect to the base in order to adjust the indicator.

5. A weighing scale comprising a base, weighing means on the base and including opposed weighing levers fulcrumed on the base, a weight-receiving platform carried by the levers and yielding weighing means adapted to be deflected by the levers in proportion to the weight of an object on the platform, said yielding means comprising a helical spring having an end bearing upon the base, one of said levers having a socket to receive the other end of the spring and a bearing way for receiving an end of the other lever whereby the spring may be compressed by both levers when a weight is applied on the platform.

6. A weighing scale comprising a base of shallow configuration, weighing mechanism comprising substantially horizontally extending lever means fulcrumed in said base, a weight receiving platform enclosing the top of said base and carried by said lever means, yielding means on said base and operatively connected to resist tilting movement of said lever means in said base under the influence of a weight applied on said platform, an indicator comprising a relatively movable pointer and graduated dial, said dial extending horizontally between said platform and the lever means, indicator actuating means including a rotatable element and a driving element connected with the rotatable element and extending substantially horizontally between the dial and said levers, a tilting lever comprising a bell crank, one arm of which is connected to said driving element, and means engaging another arm of said bell crank for tilting the same in response to movement of the lever means.

RICHARD C. BARLER.
CARL BURKHARD.

DISCLAIMER 2,066,243.—*Richard C. Barler* and *Carl Burkhard*, Goshen, Ind. WEIGHING SCALE. Patent dated December 29, 1936. Disclaimer filed February 25, 1943, by the assignee, *Continental Scale Corporation*.

Hereby enters this disclaimer to claims 2 and 6 in said specification.

[*Official Gazette March 23, 1943.*]